Figure 1:
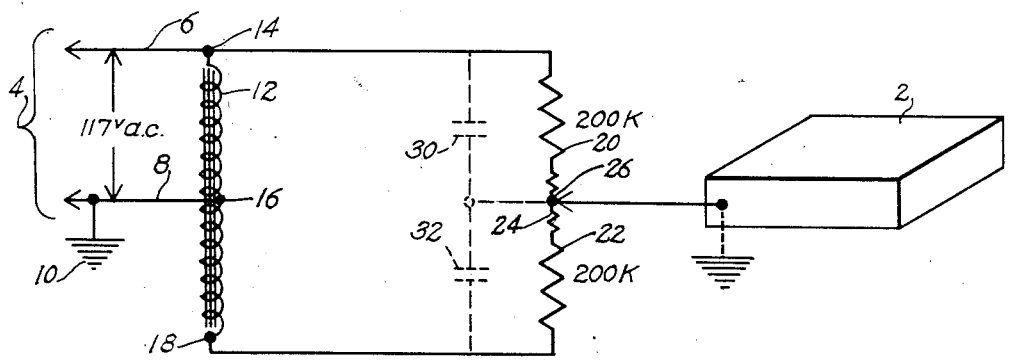

May 7, 1957 P. TRAUGOTT 2,791,728
SAFETY GROUND CONNECTION FOR ELECTRICAL TESTING DEVICES
Filed April 8, 1954

INVENTOR.
Paul Traugott
BY
Max L. Libman
Attorney

United States Patent Office 2,791,728
Patented May 7, 1957

2,791,728

SAFETY GROUND CONNECTION FOR ELECTRICAL TESTING DEVICES

Paul Traugott, Greenwich, Conn., assignor to Electro-Physical Laboratories, Inc., Boston, Mass., a corporation of New York Application April 8, 1954, Serial No. 421,765

5 Claims. (Cl. 317—17)

This invention relates to a safety ground connection for electrical testing devices and has particular reference to a safety ground circuit for an electrocardiograph.

Practically all modern electrocardiograph machines employ amplifying circuits, which receive their power from any ordinary 110-120 volt alternating current power circuit, which is usually transformed to appropriate voltage values and rectified to provide the necessary high voltage direct current plate supply, screen supply, etc., as well as the usual low voltage alternating current heating current. The chassis on which the electronic and electrical components are mounted is invariably used as the ground return for the electric circuitry. Therefore, for safety reasons, and also to provide a reference zero potential, the chassis or casing (if it is conductive) should also be grounded with respect to its outside environment, e. g., the user of the equipment or the patient. Most of the available grounding points or locations where these instruments are used are not conveniently accessible, or present practical difficulties in making connections thereto. In practically all American power circuits, one side of the 110 volt surface is connected to an external grounding point, and it has become the practice to use this grounded side of the power line for the necessary grounding connection to the electrocardiograph. The use of this power line connection, however, presents certain shock hazards unless special precautions are taken. The most usual precaution is to isolate the grounding point of the electrocardiograph, which is usually the chassis, from the power line ground by a sufficiently high resistance or impedance to reduce any posisble shock current which might flow in the circuit through any mischance to a completely harmless magnitude. When this is done, it is usually discovered that a sufficient alternating current potential exists at the chassis to produce interference with the patient circuit. It must be kept in mind that the voltages which are measured when taking an electrocardiogram are extremely small and require very great amplification, so that even small extraneous voltages will undesirably effect the resulting readings. It is a primary object of the present invention to eliminate or cancel out these undesirable effects.

Another object of the invention is to provide a conductive grounded circuit for the chassis of a sensitive test device such as an electrocardiograph which is isolated from ground by a sufficiently high resistance for complete safety, while, at the same time, maintaining the chassis substantially exactly at ground potential.

The above objects are accomplished according to my invention by making the electrocardiograph chassis, which is also a neutral grounding point of its amplifier circuit, part of a balanced bridge network with the external ground plane and the chassis as opposite poles of the network. This is accomplished through the use of an alternating current bridge using mutual inductance in one arm. By properly proportioning the values, a sufficiently good balance can be made so that the alternating current potential on the electrocardiograph chassis measured against the external ground plane can be reduced to an insignificantly small quantity, while, at the same time, the impedance of the path between the chassis and any external grounding point is kept sufficiently high to reduce shock hazard to practically zero.

Figure 2:
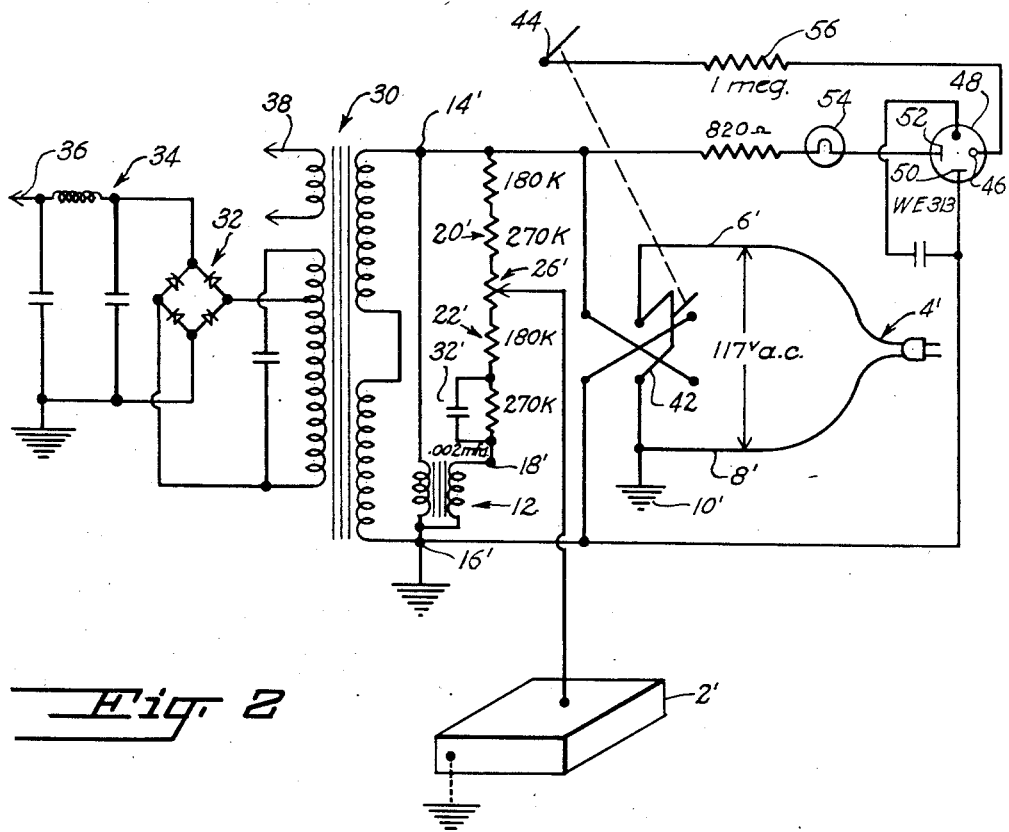

The specific nature of the invention, as well as other objects and advantages thereof, will clearly appear from a description of a preferred embodiment as shown in the accompanying drawing, in which:

Fig. 1 is a schematc circuit diagram showing the basic principle of the invention; and Fig. 2 is a somewhat more detailed circuit diagram showing the invention applied to a practical electrocardiograph circuit.

Referring to Fig. 1, the casing or chassis of a sensitive testing instrument, e. g., an electrocardiograph is indicated at 2. The electrical circuitry of the instrument is assumed to be housed within the casing, and the casing is to serve as a ground point for this circuitry. Power is supplied from an external source 4, assumed to be an ordinary alternating current outlet through lines 6 and 8, the latter of which is grounded at 10. The primary winding of mutual inductance transformer 12 is connected across the line as indicated at 14 and 16, and secondary is connected at one end to the grounded side of the line as shown, the two windings being preferably, although not necessarily, equal. It will thus be seen that the grounded line 8 is now at the center point of the voltage developed between terminals 14 and 18 of the two windings taken as a unit. Across these two terminal points are connected a series arrangement of two resistors 20 and 22, whose value may be of the order of 200,000 ohms, and an adjustable resistor 24 between them. The contact point 26 of the adjustable resistor 24 is now connected to the chassis 2, to complete the grounding arrangement. It will be seen that the two inductance arms and the two resistance arms form in effect a bridge, and that by adjusting slider 26, the bridge may be balanced so that the potential of the slider point is almost exactly the same as that of the grounded line 8. Thus the chassis is at the same potential as ground, so that the reference potential becomes the external ground potential, although as can be seen, it is effectively isolated from ground by means of the two resistances 20 and 22 since any path of the chassis to ground must pass through at least one of these resistances. Since some phase unbalance may be introduced due to the capacitive coupling between the turns or windings of the coils, it may be desirable to introduce compensating capacitances 30 and 32 in parallel with one or both of the resistor arms, depending on the physical dimensions of the coils and their spacing.

Fig. 2 shows essentially the same circuit as Fig. 1, but includes additional elements necessary to provide the power supply for the electronic units housed within the chassis and the circuit values shown are those used in a practical embodiment of the device. The components of the grounding circuit have the same numerals as in Fig. 1, but with a prime (') added. Additional components are the customary power transformer 30, full-wave rectifier 32, and filter 34, whereby a B+ supply is made available on lead 36 and filament heating power is made available at the secondary 38 of transformer 30. In practice, all of the components shown, including the grounding circuit components, will be housed inside of the chassis 2', and alternating current power from lines 6' and 8' will be supplied by means of the usual electric cord and plug and passed through an insulating bushing into the interior of the housing. The details of the electrocardiograph or other testing instrument circuitry are not shown, as they do not constitute any part of the present invention, suitable electrical circuits for these purposes being well known.

An additional useful feature shown in Fig. 2 is the ground-determining indicator, usually termed the power line polarity indicator. This is for the purpose of insuring that the grounded side of the power line is connected to point 16', since if the power cord is plugged in the wrong way, point 14' will be the grounded point and the entire purpose of the invention will be defeated. The plug 40 is inserted at random and a reversing switch 42, having a conductive actuator or handle 44, is provided. The operator grasps the actuator 44, which is thus grounded through the operator's body and closes the reversing switch 42 in either direction at random. If the connection is correct, a potential will be established through the control electrode 46 of cold cathode tube 48, which will break down and conduct between electrodes 50 and 52, to establish a circuit through a signal lamp 54. If the connection is incorrect, control electrode 46 will be at the same potential as electrode 50 and the tube will not conduct to light the signal lamp 54. The operator will, of course, not be harmed because of the one megohm resistor 56 in the circuit. Thus a simple and effective device is provided for insuring the correct connection to ground of the power circuit. In practice, switch actuator 44 may take any suitable physical form such as a rotary switch control element angularly movable from an intermediate open circuit position to either of two closed circuit positions which represent the respective reversed connections of the power line.

It will be apparent that the embodiments shown are only exemplary and that various modifications can be made in construction and arrangement within the scope of my invention as defined in the appended claims.

I claim:

1. In combination with a conductive chassis for electrical testing apparatus having electric circuits and electronic tube components, means for supplying high voltage operating power from an external grounded power line to electrical apparatus within said chassis, means for grounding said electrical apparatus to said chassis, and means for establishing said chassis at the external ground potential only through a high impedance, comprising an inductance unit and a resistance unit connected in parallel in two junction points, said power line being connected between one of said junction points and an intermediate point of said inductance unit, said intermediate point being grounded, said chassis being connected to the intermediate point of said resistance unit having the same potential as the ground connection of the power line.

2. The invention according to claim 1, said inductance and resistance values being so proportioned that the conductive path from said chassis to the power line ground from the intermediate point of said resistance unit has substantially the same high resistance in either direction.

3. The invention according to claim 2, said resistance unit comprising two high resistance elements of substantially equal value and an intermediate potentiometer resistance unit, and means for adjusting the point of connection of said chassis to said intermediate potentiometer unit.

4. The invention according to claim 3, and a reversing switch for the power line connection, and means for indicating in which position of the switch the grounded side of the power line is connected to the intermediate point of said inductance unit.

5. For use with electrical testing apparatus having electric circuits and electronic tube components, a conductive chassis for said circuit and components, means for supplying high voltage operating power from an external grounded power line to said testing apparatus, a grounding connection for said testing circuit on said chassis, and means for establishing said chassis at the external ground potential only through a high impedance, comprising a four-element network comprising two series-connected inductance elements having mutual inductance and two series-connected resistance elements, one of said inductance elements being connected across said power line, the grounded side of said line being at the junction of said two inductances, said series-connected resistors being connected across the ungrounded side of said line and the free end of the two inductance elements, and said chassis being connected to a point between said resistance elements.

References Cited in the file of this patent
UNITED STATES PATENTS 745,929  Thury _____ Dec. 1, 1903

FOREIGN PATENTS 713,337  Germany _____ Nov. 6, 1941